INVENTORS
Walton E. Briggs
Albert C. Jones 3,085,198
COMBINATION LEAK DETECTOR AND
VACUUM GAUGE
Walton E. Briggs, Lynnfield Center, and Albert C. Jones, Stoneham, Mass., assignors to General Electric Company, a corporation of New York
Filed Feb. 17, 1959, Ser. No. 793,718
5 Claims. (Cl. 324—33)

This invention relates to a combination leak detector and vacuum gauge and, more particularly, to an improved arrangement which requires only a single detector gauge and a single electrical indicator to provide both vacuum and leak indications.

The so-called ionization gauge useful in this invention may be of the type described by Penning in U.S. Patent 2,197,079. In such a gauge, a current discharge between a pair of electrodes is deflected by a magnetic field to lengthen the path of the electrons and cause a higher degree of positive ion formation with the intensity of the discharge current being measured as a function of the pressure of the gas in the discharge space. If the gauge is connected to a closed system and a vacuum applied, the same gauge will respond to variations within the system caused by in-leakage from the surrounding atmosphere. Leaks may be detected and/or measured by directing a small jet of a gas to which the gauge is particularly responsive to localized areas suspected of leakage. A leak will be indicated by a sudden variation in the ionization current.

It is an object of this invention to provide an improved circuit arrangement in which a single detector gauge may be selectively utilized either as a vacuum gauge or a leak detector and/or measuring instrument.

It is a further object of this invention to provide a combination vacuum gauge and leak detector in which the gauge signal may be balanced to zero when only air is passing through the leak in the system under test for leak indications.

It is a still further object of this invention to provide a combination vacuum gauge and leak detector requiring only a single gas responsive detector gauge and a single indicating instrument in which the leak detector provides a momentary indication of a leak and then rebalances in preparation for further leak indications.

Further objects and advantages of the invention will become apparent as the following description proceeds; and the features of novelty which characterize the invention will be pointed out with particularity in the claims annexed to and forming a part of this specification.

In accordance with one form of the invention, an ionization gauge of the cold-cathode type is connected in series with a source of voltage and an electrical instrument to indicate the magnitude of the current discharge in the gauge as a measure of the vacuum of the system to which the gauge is connected. The electrical indicating instrument may be of the voltmeter type connected in parallel with a resistor across which a signal voltage is developed in response to the current discharge in the gauge. Switching means are provided to selectively convert the instrument to detect and/or measure leaks by connecting a series circuit comprising a reference voltage and the indicating instrument in shunt with an adjustable impedance across which a signal voltage responsive to the gauge discharge is developed. Means are provided to balance the voltage difference between the reference voltage and that across the adjustable impedance to zero when only air is passing through the leak. The closed system may then be probed at localized areas suspected of leakage with a tracer gas to which the ionization gauge is particularly responsive and the indicating instrument will respond when the tracer is drawn through a leak.

For a better understanding of this invention, reference may be had to the accompanying drawings in which.

Figure 1:
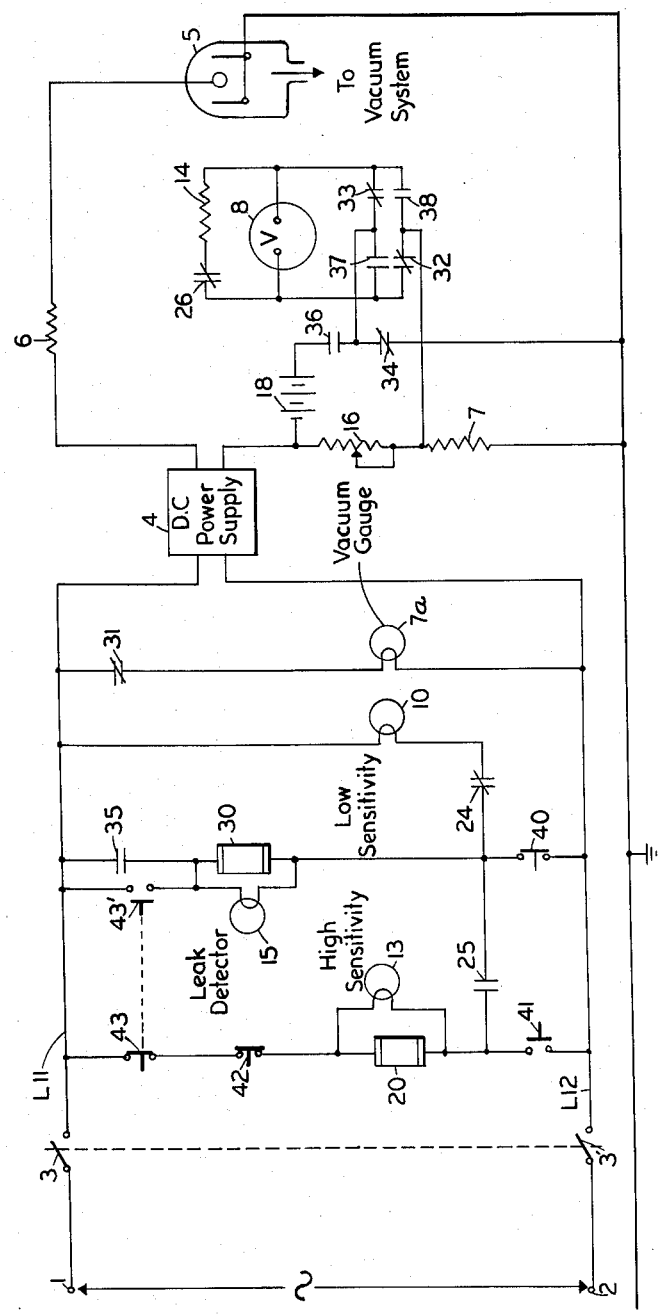
FIG. 1 is a schematic representation of a circuit embodying the invention.

FIG. 1 is drawn as an across-the-line diagram with the contacts shown in the unenergized position. Each relay and its associated contacts are numbered with the same first digit followed by a distinguishing digit to facilitate the understanding of the operation of the invention. Referring to FIG. 1, the input power, 110 volts A.C., is applied between terminals 1 and 2 and through the double-pole, single-throw switch 3, 3' to lines L11 and L12 when switch 3, 3' is in the closed position. Power is immediately applied to the 2000-volt D.C. power supply indicated by block 4.

The line voltage L11, L12 is simultaneously applied through normally closed contacts 31 associated with relay 30, which will be described later, to an indicating lamp 7a labeled "Vacuum Gauge" on the equipment cabinet (not shown) to indicate that the equipment in the condition as shown will function as a vacuum gauge. The power supply 4 may conveniently be of the type marketed by the HD and K Laboratories, and identified by their catalog number KP60–2M2. The D.C. output of the power supply 4 is applied to the electrodes of the cold-cathode ionization gauge 5 in series with current limiting resistor 6, a one megohm resistor. The detector gauge 5 may be of the type described in the aforesaid Penning patent or may be a heated type ionization gauge, a Pirani gauge, thermocouple or any suitable detector gauge a characteristic of which is a differential response to different gases or atmospheres within the gauge.

Current which results from the discharge within the ionization gauge varies with pressure variations within the gauge and passes through the current limiting resistor 6, gauge 5, and a series resistance comprising a fixed 200-ohm resistor 7 and a 100K potentiometer 16. Variations of current flow through resistor 7 develop a signal voltage which varies as the pressure within the gauge 5. An electrical indicating instrument, voltmeter 8, is connected across the resistor 7 through normally closed contacts 32 on one side and normally closed contacts 33 and 34 on the ground side.

At the closing of switch 3, 3', line voltage L11, L12 is also applied through the normally closed contact 24 and normally closed pushbutton 40 to energize indicating lamp 10 which indicates that voltmeter 8 is in the low-sensitivity condition through the shunting of the voltmeter by resistor 14 and normally closed contacts 26.

High-sensitivity operation may be accomplished by momentarily depressing normally open pushbutton 41 to apply line voltage to relay 20 and the high-sensitivity indicating lamp 13 through normally closed pushbuttons 42 and 43. Normally open contacts 25 close and complete the relay 20 energizing circuit through normally closed pushbutton 40 so that relay 20 continues to be energized after pushbutton 41 is released. At the same time normally closed contacts 24 are opened to de-energize the low-sensitivity indicating lamp 10, and normally closed contacts 26 are opened removing resistor 14 from in shunt with the voltmeter 8 to increase the sensitivity of the voltmeter. The additional range is indicated on a suitably calibrated voltmeter scale (not shown).

Therefore, with switch 3, 3' closed, the instrument will function as a vacuum gauge with the indicating lamp 7a denoting vacuum gauge operation and the voltmeter 8 connected directly across resistor 7 to indicate the degree of vacuum within the system on a suitably calibrated scale (not shown). The instrument may be connected in either the high or low sensitivity condition depending on whether pushbutton 41 has been actuated.

The instrument may be converted to a leak detector by actuation of pushbutton 43, 43'. Actuation of pushbutton 43, 43' disconnects line voltage from relay 20 causing it to open and at the same time contact 43' energizes relay 30 and the leak detector indicating lamp 15 through normally closed pushbutton 40. The energization of relay 30 accomplishes a plurality of functions including the closure of the normally open contacts 35 which act as a holding contact when the pushbutton 43 no longer is depressed, and the opening of normally closed contacts 31 to deenergize the vacuum gauge indicator lamp 7a.

The energization of relay 30 also opens normally closed contacts 32, 33, and 34 associated with the voltmeter and closes the normally open contacts 36, 37, and 38. It is to be noted that contacts 31 through 38 are associated with relay 30 and are all actuated simultaneously from the position shown in FIGURE 1 to the opposite position upon the energization of relay 30. The effect of the energization of relay 30 on the voltmeter circuit is such as to connect the side of the voltmeter adjacent resistor 14 to the junction between resistor 7 and rheostat 16 through the normally open contacts 38. The other side of the voltmeter is connected via the normally open contacts 36 and 37 to one side of the reference battery 18. The other side of the reference battery is in turn connected to the other side of potentiometer 16. Thus, during leak detector operation, the voltmeter 8 and battery 18 are placed in shunt with the potentiometer 16. If desired, the battery 18 and voltmeter 8 could be connected across the series resistance comprising resistor 7 and potentiometer 16 rather than just across potentiometer 16. The reference voltage could, of course, be obtained by any suitable source, such as a separate rectifier circuit, or from a voltage divider arrangement in circuit with a convenient voltage, such as that provided by the power supply 4.

As during operation of the apparatus as a vacuum gauge, the instrument will have two sensitivity ranges, high or low, depending upon whether or not relay 20 has been energized and the condition of operation will be indicated by the appropriate indicator lamp.

Potentiometer 16 is then adjusted to cause a zero voltage or a null balance indication on voltmeter 8 with the gauge 5 connected to the vacuum system under test. It is preferable to have the instrument in the high-sensitivity operating condition to obtain a more accurate balance.

The outside of the system under test is then probed with a tracer gas such as helium and when the tracer flow is brought near a leak, helium is drawn into the evacuated system to cause a relatively large change in gauge current. The voltage drop across potentiometer 16 varies with variations in gauge current and the voltmeter 8 indicates the difference between the potentiometer and reference voltages as a leak indication.

Figure 2:
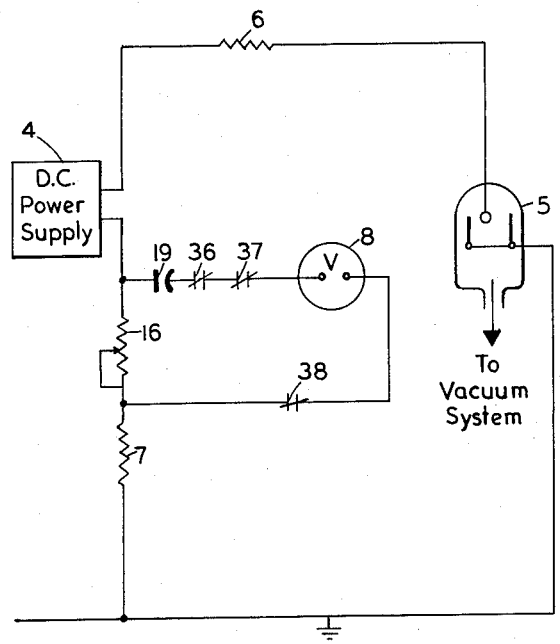
FIG. 2 is a schematic representation of a variation of a portion of the circuit shown in FIG. 1, with certain components omitted for clarity.

FIGURE 2 shows a modification of the voltmeter circuit of FIGURE 1 in somewhat simplified form in which the reference battery 18 has been replaced by a reference capacitor 19. The operation of the circuit shown in FIGURE 2 is as follows: Under steady-state conditions, capacitor 19 builds up to the voltage developed by the current flow across potentiometer 16 and voltmeter 8 will indicate zero voltage. In order to hasten the voltage buildup, potentiometer 16 may conveniently be adjusted to its maximum resistance to impress a large voltage across capacitor 19. Capacitor 19 will develop a voltage at a rate determined in part by the applied voltage. When capacitor 19 has built up to a substantial portion of the voltage across potentiometer 16, the potentiometer may be adjusted to provide a null balance. Introduction of the tracer gas into the gauge 5 through a leak being probed will cause a variation in the current flow through potentiometer 16 which will result in a momentary unbalance between the potentiometer voltage and the voltage across capacitor 19. The current variation and leak presence will be indicated by a deflection of voltmeter 8, after which capacitor 19 will charge to the new voltage across the potentiometer 16 and rebalance the circuit to ready it for a new leak indication.

The leak detector arrangement shown in FIGURE 1 is suitable for leak indication and/or measurement whereas the leak detector arrangement shown in FIGURE 2 is more suitable as a leak indicator since the momentary deflection of voltmeter 8 does not give as accurate a quantitative measure of leak as is accomplished by the arrangement of FIGURE 1.

Therefore, while particular embodiments of the subject invention have been shown and described herein, they are in the nature of description rather than limitation, and it will occur to those skilled in the art that various changes, modifications, and combinations may be made within the province of the appended claims and without departing either in spirit or scope from this invention in its broader aspects.

What we claim as new and desire to secure by Letters Patent of the United States is:

1. In a combination pressure gauge and leak detector, a pressure gauge comprising, a detector gauge an electrical characteristic of which varies with the atmosphere therein, said gauge variations being responsive to the pressure of the atmosphere and particularly responsive to the presence of a predetermined tracer gas, an electrical indicating instrument, and a source of voltage in circuit with said detector gauge and said instrument such that said instrument operates as a pressure gauge and indicates said gauge variations which result from changes in the pressure of said atmosphere, an arrangement for selectively converting said pressure gauge to a leak detector to indicate the presence of said tracer gas within the detector gauge and comprising, an electrical reference source, and switching means to connect said reference and said electrical indicating instrument in circuit with an electrical signal which varies with said electrical characteristic so that said instrument indicates the difference between said varying signal and said electrical reference.

2. In a combination pressure gauge and leak detector, a pressure gauge comprising a detector gauge an electrical characteristic of which varies with the atmosphere therein, said gauge variations being responsive to the pressure of the atmosphere and particularly responsive to the presence of a predetermined tracer gas, an electrical indicating instrument and a source of voltage connected in series with said detector gauge, an arrangement for selectively converting said pressure gauge to a leak detector to indicate the presence of said tracer gas within the detector gauge and comprising, an electrical reference source, a switch to connect said reference and said electrical indicating instrument in circuit with a signal which varies with said electrical characteristic so that said instrument indicates the difference between said varying signal and said reference, and means to selectively balance said varying signal and said reference.

3. In a combination pressure gauge and leak detector, a pressure gauge comprising a detector gauge an electrical characteristic of which varies with the atmosphere therein, said gauge variations being responsive to the pressure of the atmosphere and particularly responsive to the presence of a predetermined tracer gas, an electrical indicating instrument and a source of voltage connected in series with said detector gauge, and a first impedance shunting said instrument so that the instrument indicates the voltage developed thereby, an arrangement for selectively converting said pressure gauge to a leak detector to indicate the presence of said tracer gas within the detector gauge and comprising a reference voltage source, and switching means to connect said reference voltage and said electrical indicating instrument in shunt with a second impedance connected in series with said voltage source and said detector gauge so that said instrument indicates the difference between said reference voltage and the voltage across said second impedance.

4. In a combination pressure gauge and leak detector, a pressure gauge comprising a detector gauge an electrical characteristic of which varies with the atmosphere therein, said gauge variations being responsive to the pressure of the atmosphere and particularly responsive to the presence of a predetermined tracer gas, an electrical indicating instrument and a source of voltage connected in series with said detector gauge, and an impedance shunting said instrument so that said instrument indicates the voltage developed thereby, an arrangement for selectively converting said pressure gauge to a leak detector to indicate the presence of said tracer gas within the detector gauge and comprising, a reference voltage source, and switching means to connect said reference voltage and said electrical indicating instrument in shunt with an impedance which is in series with said detector gauge so that said instrument indicates the difference between said reference voltage and the voltage across said series impedance, at least a portion of said series impedance being adjustable.

5. In a combination pressure gauge and leak detector, a pressure gauge comprising a detector gauge of the ionization type, an electrical characteristic of which varies with the atmosphere therein and particularly in response to a predetermined tracer gas, an electrical indicating instrument, and a source of voltage connected in series with said detector gauge and said instrument, an arrangement for selectively converting said pressure gauge to a leak detector to indicate the presence of tracer gas within the detector gauge and comprising a reference capacitor, switching means to connect said capacitor and said electrical indicating instrument in shunt with a signal voltage which varies with said electrical characteristic, and means to balance the signal voltage and the voltage built up across the capacitor so that said instrument indicates subsequent differences between said varying voltage and said capacitor voltage.

References Cited in the file of this patent
UNITED STATES PATENTS

| | | |
|---|---|---|
| 2,806,991 | White | Sept. 17, 1957 |
| 2,820,946 | Robinson | Jan. 21, 1958 |
| 2,830,263 | Shapiro | Apr. 8, 1958 |
| 2,873,425 | Huggins | Feb. 10, 1959 |